United States Patent [19]

Martin

[11] Patent Number: 4,835,687
[45] Date of Patent: May 30, 1989

[54] METHOD FOR OPTIMIZED MANAGEMENT OF A SYSTEM OF PIPELINES AND A PIPELINE SYSTEM REALIZATION IN ACCORDANCE WITH SAID METHOD

[75] Inventor: Jean C. Martin, Marnes La Coquette, France

[73] Assignee: Cimsa Sintra, Asnieres, France

[21] Appl. No.: 905,437

[22] Filed: Sep. 10, 1986

[30] Foreign Application Priority Data

Sep. 10, 1985 [FR] France .................................. 85 13415

[51] Int. Cl.$^4$ .............................................. G06G 7/50
[52] U.S. Cl. ................................... 364/402; 364/510; 48/190; 417/2
[58] Field of Search ...................... 48/190, 191; 417/2, 417/4, 7, 18; 364/402, 510

[56] References Cited

U.S. PATENT DOCUMENTS

| | | | |
|---|---|---|---|
| 3,072,058 | 1/1963 | Christopher | 417/2 X |
| 3,160,101 | 12/1964 | Bartoseski | 417/7 |
| 3,229,639 | 1/1966 | Hignutt | 417/7 X |
| 4,200,911 | 4/1980 | Matsumoto | 364/510 X |
| 4,204,808 | 5/1980 | Reese | 417/2 |
| 4,290,735 | 9/1981 | Sulko | 417/2 |
| 4,330,237 | 5/1982 | Battah | 417/2 |
| 4,526,513 | 7/1985 | Bogel | 417/18 X |
| 4,729,106 | 3/1988 | Rush et al. | 364/510 |

OTHER PUBLICATIONS

Datta-Barue, "Systems Approach to Electronic Measurement Taken for Gas Custody Transfer," Oil & Gas Journal, vol. 82, No. 39, Sep. 1984, pp. 79-83.

Baxter, "Automated System Minimizes Pipeline Power, Calculates Rates," Oil & Gas Journal, vol. 79, No. 40, Oct. 1981, pp. 148, 150, 153, 154.

Vergnes, "Minicomputers Operate French Products Pipeline," Oil & Gas Journal, vol. 80, No. 6, Feb. 1982, pp. 130-132.

McClure, "Linear Programming Offers Way to Optimize Pipeline Analysis," Oil & Gas Journal, vol. 81, No. 29, Jul. 1983, pp. 135-138.

Primary Examiner—Jerry Smith
Assistant Examiner—Steven G. Kibby
Attorney, Agent, or Firm—Pollock, VandeSande & Priddy

[57] ABSTRACT

In order to achieve optimized management of a pipeline system for transporting gas, oil or other products, the flow rates and pressures at various system locations are determined and regulated in real time. The configurations of compressors and valves which make it possible to minimize operating costs are determined in real time by computers.

6 Claims, 6 Drawing Sheets

FIG_2

FIG_3

FIG_7

FIG. 5

METHOD FOR OPTIMIZED MANAGEMENT OF A SYSTEM OF PIPELINES AND A PIPELINE SYSTEM REALIZATION IN ACCORDANCE WITH SAID METHOD

BACKGROUND OF THE INVENTION

1. Field of the Invention

The present invention is primarily directed to a method for optimized management of pipelines as well as to a pipeline system constructed and arranged in accordance with said method.

2. Description of the Prior Art

Transportation of raw materials by gas or oil pipelines permits a reduction in operating costs. It is for this reason that large networks of gas and oil pipelines have been developed for transportation and distribution of petroleum products, for example. The fluid is circulated by compression or pumping stations. In gas pipeline systems of a known type, each compression station operator has the responsibility of ensuring good operation while satisfying requirements in regard to flow rates and pressures. In known types of equipment, efforts are made to achieve minimum variation in the operating parameters of a gas pipeline system.

SUMMARY OF THE INVENTION

The device in accordance with the invention ensures optimized management of a system of gas pipelines, oil pipelines and pipelines for transportation of coarse-particle solids in suspension in a fluid. Optimization permits delivery of the required fluid at specified locations of the system while at the same time minimizing in particular the number of compressors in operation and the power consumption as well as maximizing the quantity of fluid stored within the pipeline.

By way of example, the following optimization criteria can be utilized:

- maximum flow rate of transported gas;
- minimum power consumption;
- difference in maximum pressure at compressor locations;
- minimum number of compressors in operation;
- maximum stock of product being transported;
- maximum flow rate at a precise location in the system;
- minimum electric power consumption;
- minimum fuel consumption.

Depending on the type of operation which may be desired, a function is determined by forming a linear combination of optimization criteria. The device in accordance with the invention will determine the equipment to be employed as well as the flow rates and pressures at different points of the pipeline system while minimizing variations in configurations of the system and of compression or pumping stations.

Moreover, statistics relating to the operation of the pipeline system in accordance with the invention can be obtained by means of hierarchical data management.

In another alternative embodiment of the device in accordance with the invention, the optimum solutions of all or a certain number of possible alternative schemes are precomputed.

These solutions are stored in computer memories. The state of the system and the requirements to be satisfied are identified with one alternative scheme, whereupon the precomputed optimum solution is adopted and stored in the computer memories. This procedure is referred to as a Computer Store Solution (CSS).

In addition, the device in accordance with the invention permits high-speed detection of operational faults. Centralized management makes it possible to minimize the consequences of partial outages of the system. The device in accordance with the invention utilizes steady-state optimizations, the results of which are checked by transient-state flow simulations. Should it prove an advantage to do so, however, the invention permits direct use of transient-state flow regimes in the optimization process. However, the possibility of utilizing transient-flow patterns for optimizing the utilization of a pipeline system entails the need for in excess of that required for steady-state optimization compute power.

The primary object of the invention is to provide a method for optimized management of a pipeline system in which the flow rates and pressures at different locations of the pipeline system are essentially determined in real time.

The invention is also directed to a pipeline system in which computers are essentially provided for determining and producing in real time the configurations of compressors and/or valves which lead to minimized operating costs.

BRIEF DESCRIPTION OF THE DRAWINGS

These and other features of the invention will be more apparent to those versed in the art upon consideration of the following description and accompanying drawings, wherein.

DESCRIPTION OF THE PREFERRED EMBODIMENTS

Figure 1:
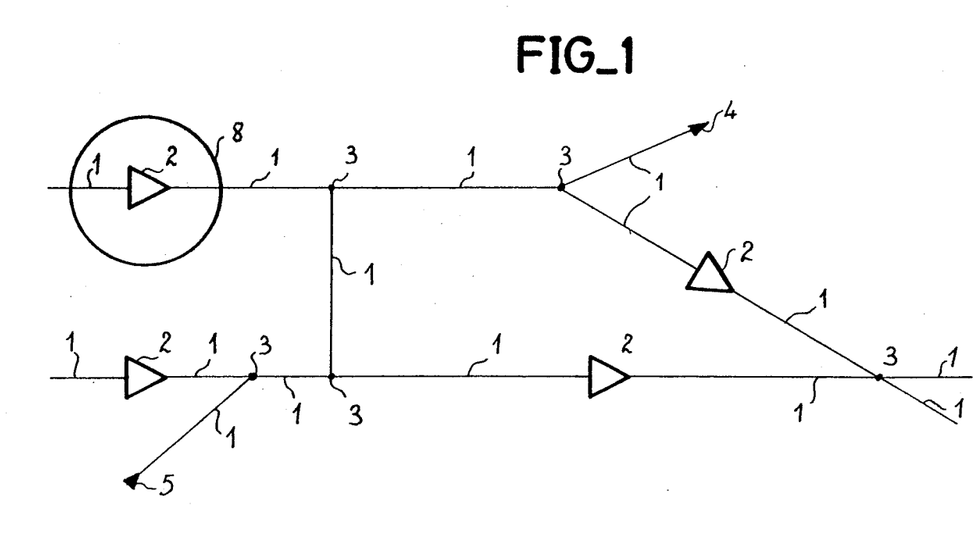
FIG. 1 is a diagram which illustrates part of a gas distribution system.
Figure 2:
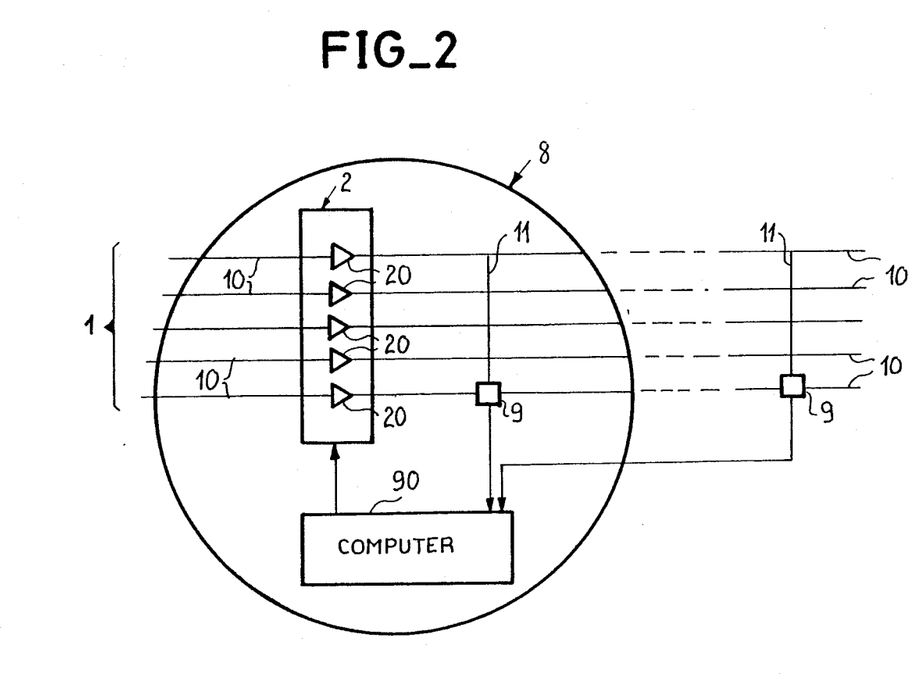
FIG. 2 is a diagram showing a detail of FIG. 1.

The diagram of FIG. 1 shows part of a gas pipeline system. By way of example, a pipeline system of this type may be intended to transport gas from a production region to a utilization region. The device which forms the subject of the present invention is also applicable to gas pipeline systems for distributing gas to consumers. The system is made up of pipelines 1 connected to each other and to valve stations 3 and provided with compression stations 2 at predetermined locations. The pipeline system of FIG. 1 serves to connect producing wells or storage tanks 5 to delivery terminals for final users or to distribution stations 4. The compression station 2 generates pressure differences within the gas pipelines 1 in order to produce flows of gas in the desired directions. The valve stations 3 serves to direct flows to users. An assembly 8 including a compression station 2 and the gas pipeline 1 connected to said assembly is illustrated in FIG. 2. The gas pipeline 1 is in fact constituted by a plurality of pipelines 10 placed in parallel. Each pipeline 10 is equipped with a compression device 20. The device in accordance with the invention is provided with means for acquisition of data relating to the state of the gas pipeline 1. The data-acquisition means may include, for example, sensors connected to microprocessors 9 through suitable interfaces. The data-acquisition means are connected to a computer 90. The computer 90 determines the means to be employed and the flow rates for optimized utilization of the system of gas pipelines as will be described.

Figure 3:
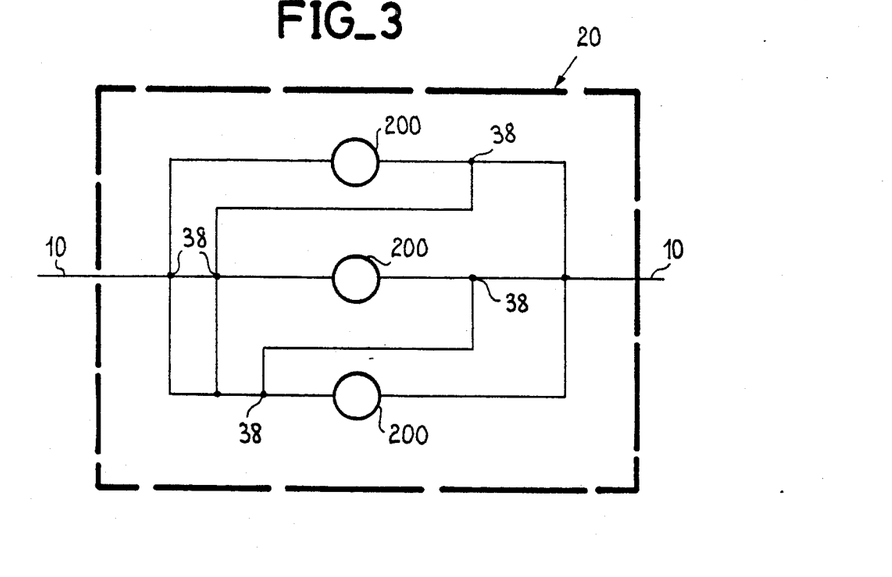
FIG. 3 is a diagram representing a compression station.

In the example illustrated in FIG. 3, a compression device 20 is made up of three compressors 200 which can be connected either in parallel or in series by means of servovalves 38. Series connection permits an increase in pressure differences between the upstream side and downstream side of the compression device 20. Each time it will be possible to do so, significant cost savings will be achieved by using the minimum number of compressors 200 for operation of the gas pipeline system.

Figure 4:
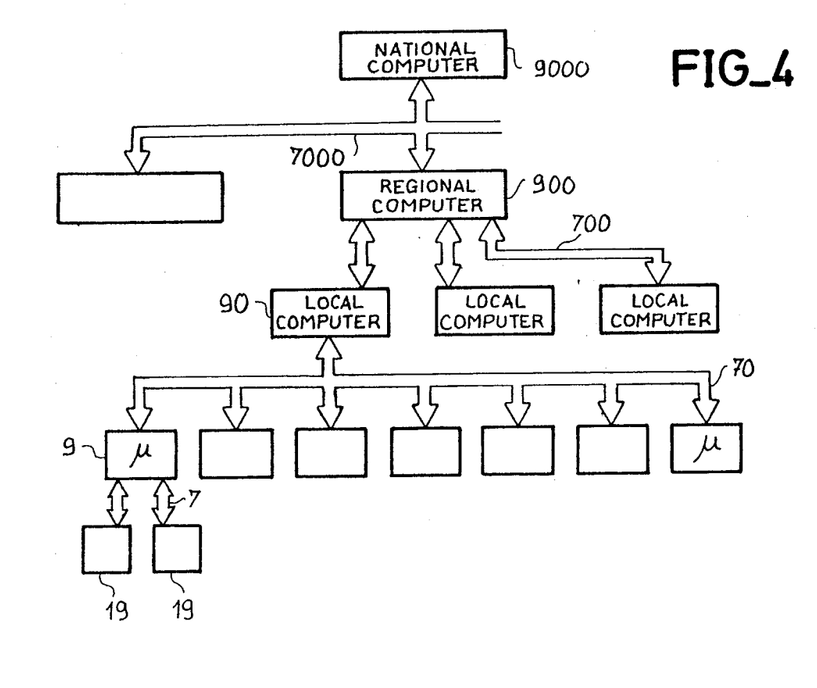
FIG. 4 is a diagram representing a hierarchical organization of a data-processing system for management of a gas pipeline system.

In FIG. 4, there is shown one example of hierarchical organization of a data-processing system for optimized management of a gas pipeline system. The device comprises a national computer center 9000 connected to regional computer centers 900 by means of a set of buses 7000. Each regional computer center is connected to local computers 90 by means of buses 700. Each computer 90 is connected to microcomputers 9 by means of buses 70. In a first alternative embodiment, a star structure is thus adopted for each degree of the hierarchy. In some instances, the computers of any one hierarchical level are connected to the computer center of higher hierarchical level by means of a single bus and are thus permitted to exchange data between each other.

Figure 7:
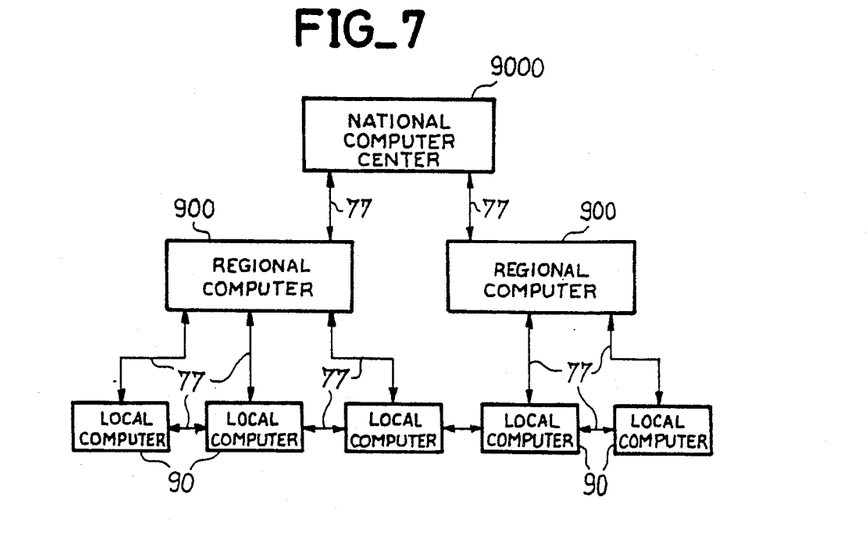
FIG. 7 is a diagram representing a hierarchical organization of a data-processing system for management of a gas pipeline system.

In one example of an alternative embodiment illustrated in FIG. 7, the local computers 90 are connected to two adjacent local computers 90 by means of two-point links 77 consisting either of electric cable lines or of radio links.

The computer center 9000 operates on a nationwide basis and has the function of management of consumption forecasts as well as interactions between a number of different gas pipeline systems. In addition, the national computer center 9000 can also carry out supervision of data exchanges between the regional computers 900. In particular, the national computer center 9000 determines a function f which gives a greater or lesser degree of importance to the various optimization criteria such as, for example, the optimization criteria described in the foregoing. The regional computers 900 adapt the optimization to the physical pipeline systems which exist in the region concerned. Furthermore, the regional computers 900 can serve to coordinate the local computers 90. The function of the local computers 90 is to perform real-time management of a group of compressors and real-time surveillance of the pipeline system. The microcomputers 9 carry out the function of data acquisition, pre-processing of acquired data and transmission to a local computer 90. The device 19 includes sensors, analog-to-digital converters and interfaces enabling the sensors to communicate with the microcomputers 9.

Figure 5:
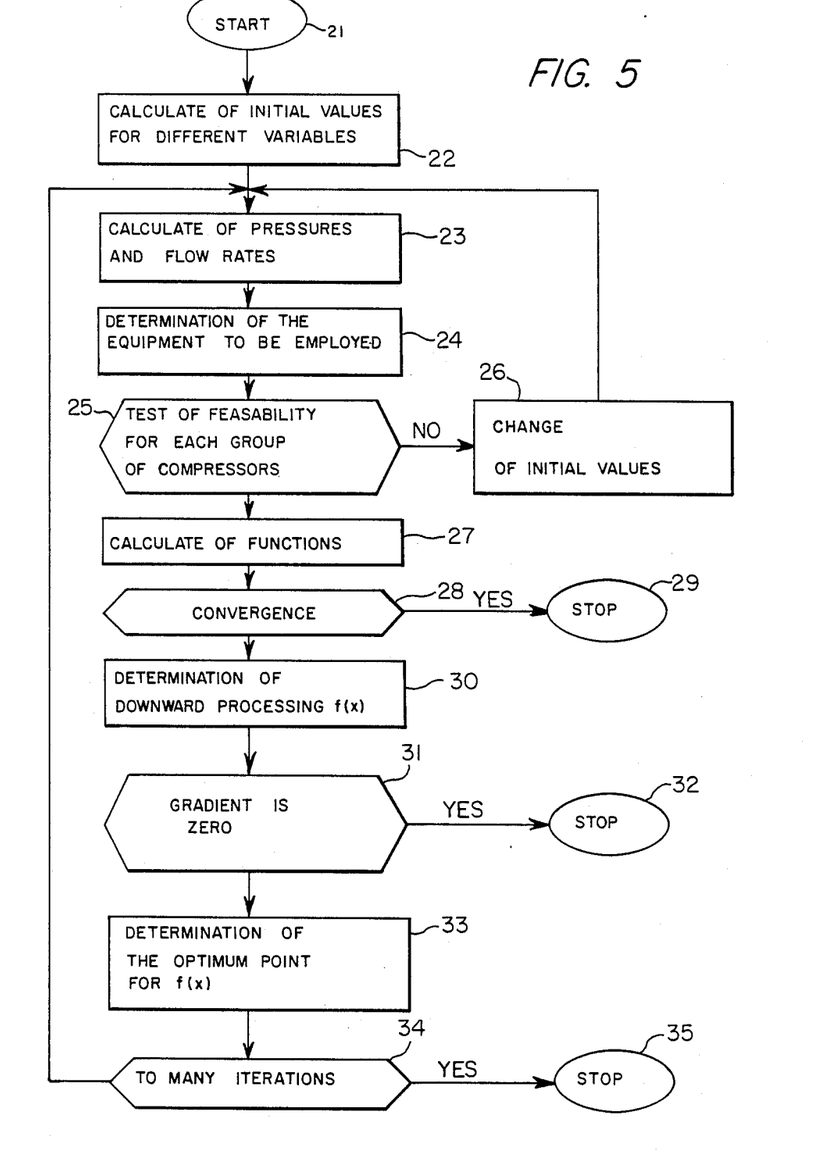
FIG. 5 is a computer program flow chart for the practical application of the invention.

There is shown in FIG. 5 a flow chart corresponding to the data-processing operations performed by all the computers 9000, 900 and 90 for supervision and optimization of management of the gas pipeline system. Optimization is determined at higher levels and carried out at the lower levels. The program starts at 21 (starting point). At 22, initial-value computations are made for the different variables of the system. The flow rate, for example, is determined at different pipeline system locations. At 23, calculations are made in order to determine the pressures and flow rates within all the important system locations at the valves 3. At point 24, the equipment to be employed with a view to obtaining the stream pressure computed at 23 is then determined. A test is conducted at 25 in order to demonstrate the feasibility of the solution computed earlier. Should it be found that the solution computed earlier is not feasible for each group of compressors, it would be necessary in such a case to proceed to 26. At 26, a change is made in the initial value. One then goes to 23. If at 25 the feasibility test is satisfactory in the case of each group of compressors, one proceeds to 27. The process step carried out at 27 involves computation of the optimization function which takes into account the optimization criteria to be satisfied. By way of example, such criteria can be as follows:

maximum flow rate of gas being transported;
minimum power consumption;
maximum pressure difference at the level of the compressors;
minimum number of compressors in operation;
maximum stock of product being transported;
maximum flow rate at a precise location of the system;
minimum electric power consumption;
minimum fuel consumption.

The optimization function f is a linear combination of the various optimization criteria to which a coefficient is assigned. Depending on the desired operation of the gas pipeline, the highest coefficient is assigned to the most important optimization criterion. Certain optimization criteria which are not essential at a given moment may be given a zero coefficient. The optimization function f(X) is a function of a state vector X which represents the pressures, flow rates and adjustments at essential locations of the gas pipeline system. Convergence of the function f(X) is checked at 28 and the computation operation is stopped at 29 if the function converges. Optimum adjustment of the gas pipeline system is then carried out. If not, one goes on to 30. Optimization of the function utilizes an adaptation of the generalized reduced gradient algorithm. There is formed the nonlinear equation system:

$$H(X)=0$$

and the inequality $$A \leq x \leq B.$$

The nonlinear equation system $H(X)=0$ expresses the external and internal constraints to which the gas pipeline system is subjected. In particular, the equation system includes the equations of conservation of mass of transported gas, the relations of conservation of kinetic momentum, the flow rates at various system locations such as, for example, at the level of external adjustments of gas pipelines. These adjustments are carried out, for example, by producing variations in compression ratios or in power delivered by the compressors.

In the inequality, A and B represent physical limitations of the device in accordance with the invention such as, for example, the minimum and maximum values of operating power of the compressors, the permissible compression ratios, and maximum discharge rates.

In accordance with the invention, adaptation of the reduced gradient algorithm lies in the fact that the control variables are permitted to change during iterations in order to prevent violation of constraints. The choice of control variables is made automatically. The direction of downward processing operations of the gradient algorithm is determined at 30. This is followed by step 31. In this step, a check is made in order to determine whether the gradient of the downward processing run is zero. Should this be the case, one then proceeds to 32, where optimization of management of the gas pipeline system has been determined. If not, one goes to 33. At 33, one determines the optimum points for the function f(X) in the downward direction of processing. One then moves on to 34. At 34, a test is performed with a view to finding out whether the number of iterations prior to achievement of optimization exceeds the possibilities of real-time computation of the system. Should this be the case, operations come to an end at 35. Optimization of the gas pipeline is impossible in accordance with the method proposed. In such a case, a precomputed solution may be adopted, for example, with a view to regulating the actuators of the gas pipeline system. If not, one goes back to 23.

As soon as optimization of the function f(X) has been completed (or in other words when the task run is at point 29 or point 32), the local computer 90 of FIGS. 2 and 4 causes the various actuators to adopt the computed optimum configuration. The computer 90 selects the equipment to be employed, in particular the number of compressors. Said computer determines the configurations in parallel and/or in series of the compressors and carries out adjustments of the various valves. Furthermore, it permits the adjustments which are necessary for taking into account data which are not transmitted at the higher levels.

Figure 6:
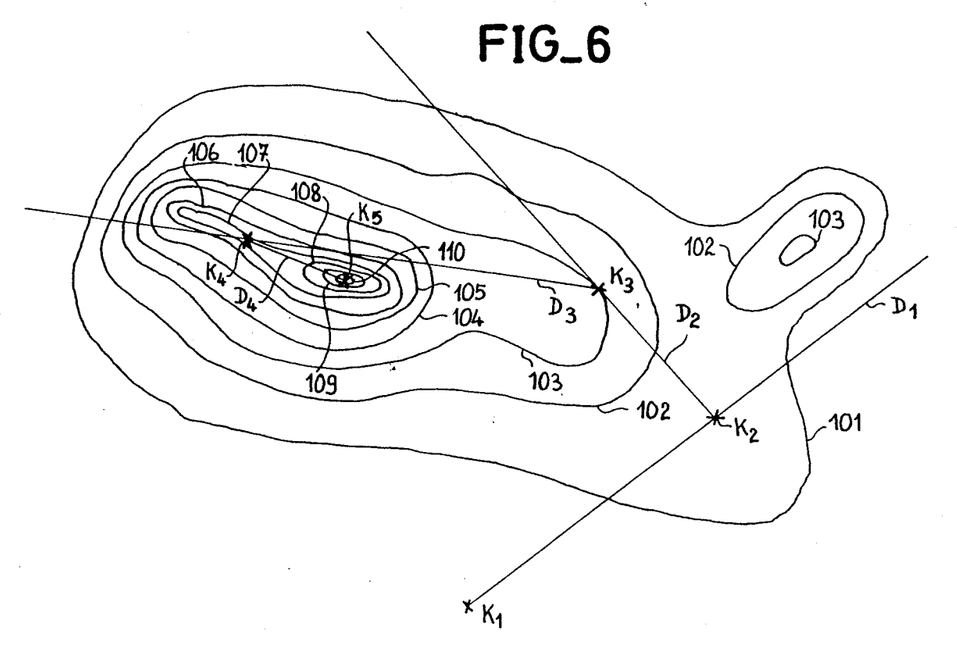
FIG. 6 is a schematic diagram of the computation which utilizes the algorithm of the generalized reduced gradient.

In FIG. 6, there is provided an illustration of the method of computation which makes use of the known generalized reduced gradient algorithm. Curves 101 to 110 are the isometric curves of the selected optimization criteria. For example, curves 101-110 are isocosts, that is to say curves corresponding to the same cost of operation of the gas pipeline system in accordance with the invention. In the example illustrated in FIG. 6, the highest references correspond to the lowest cost or in other words to the objective to be attained. The starting data correspond for example to point K1 in the diagram. The straight line D1 corresponds to the steepest slope of downward processing starting from the point K1. The direction of downward processing is computed in the flow chart of FIG. 5 at the point 30. The gradients or the slope of the straight line D1 are not zero since the curve 101 is intersected. The points K2 is the point on the straight line D1 corresponding to the lowest cost. Starting from point K2, the same operations are repeated by determining the direction of downward processing which corresponds to the straight line D2 and by determining the point K3 of minimum cost on said straight line. Similarly, the straight line D4 corresponding to the highest downward-processing gradient determined starting from the point K3; and the point K4 corresponding to the point of minimum cost is determined on said straight line. The point K5 is reached in like manner. At the point K5, the function f(X) converges and the computation is therefore stopped, the point reached being the "stop" point 29 of FIG. 5.

As will readily be apparent, the cost varies continuously between the curves 101 to 110. FIG. 6 is only an explanatory two-dimensional example. In actual fact, the diagram of FIG. 6 corresponds to a space whose dimensions are equal to the dimensions of the vectors X.

It should be understood that the device and the method described in the foregoing apply not only to gas pipelines but also to oil pipelines for transporting crude oil or refined petroleum products, to aqueducts for transporting water or aqueous products, to systems for conveying coal suspended in water and in a broader sense to all pipeline systems.

What is claimed is:

1. A method for the management of a pipeline system including plural valves, piping connected therewith and with plural pumping locations at least selected pumping locations including groups of pumping means, said selected pumping locations operable in different conditions providing different flow rates, pressure differences and costs of operation, said method relying on real time determination of flow rates and pressures, comprising the steps of:

(a) calculating a set of flow rates and pressure differences at each of various points in said pipeline system, (b) determining the pumping locations to be employed so as to meet the flow rates and pressure differences calculated in said step (a), (c) determining an optimum condition for operation of said selected pumping locations to achieve the selected flow rates and pressure differences relying on a minimum number of said pumping means, (d) detecting in real time data representing flow rates and pressures in said pipeline system, and (e) controlling said pumping means at said selected pumping locations in accordance with said data of step (d) and with the optimization of step (c), wherein:

(f) said step of determining an optimum condition includes optimizing by use of a generalized reduced gradient algorithm.

2. The method as recited in claim 1 which includes a step of testing feasibility of the pumping locations selected in said step (b) to meet the flow rate and pressure differences selected in said step (a) prior to executing said step (c), and, (g) in the event said feasibility testing indicates infeasibility repeating said method beginning at said step (a), or (h) in the event said feasibility testing indicates feasibility then continuing execution of said method with execution of said step (c).

3. The method as recited in claim 1 wherein said optimum condition is such as to minimize pipeline operating costs by selecting specific connections between said pumping means at said selected pumping locations.

4. The method as recited in claim 1 wherein said optimum condition is such as to minimize pipeline operating costs by selecting specific operating speeds of said pumping means at said selected pumping locations.

5. A method for the management of a pipeline system including plural valves, piping connected therewith and with plural pumping locations at least selected pumping locations including groups of pumping means, said selected pumping locations operable in different conditions providing different flow rates, pressure differences and costs of operation, said method relying on real time determination of flow rates and pressures, comprising the steps of:

(a) calculating a set of flow rates and pressure differences at each of various points in said pipeline system, (b) determining the pumping locations to be employed so as to meet the flow rates and pressure differences calculated in said step (a), (c) determining an optimum condition for operation of said selected pumping locations to achieve the selected flow rates and pressure differences relying on a minimum number of said pumping means, (d) detecting in real time data representing flow rates and pressures in said pipeline system, and (e) controlling said pumping means at said selected pumping locations in accordance with said data of step (d) and with the optimization of step (c), wherein:

(f) said step (c) determines an optimum condition for operation based on a pipeline system modeled using a steady state flow pattern.

6. A method for the management of a pipeline system including plural valves, piping connected therewith and with plural pumping locations at least selected pumping locations including groups of pumping means, said selected pumping locations operable in different conditions providing different flow rates, pressure differences and costs of operation, said method relying on real time determination of flow rates and pressures, comprising the steps of:

(a) calculating a set of flow rates and pressure differences at each of various points in said pipeline system, (b) determining the pumping locations to be employed so as to meet the flow rates and pressure differences calculated in said step (a), (c) determining an optimum condition for operation of said selected pumping locations to achieve the selected flow rates and pressure differences relying on a minimum number of said pumping means, (d) detecting in real time data representing flow rates and pressures in said pipeline system, and (e) controlling said pumping means at said selected pumping locations in accordance with said data of step (d) and with the optimization of step (c), wherein:

(f) said step (c) determines an optimum condition for operation based on a pipeline system modeled using a transient flow pattern.

* * * * *